(12) United States Patent
Kürten et al.

(10) Patent No.: US 7,677,599 B2
(45) Date of Patent: Mar. 16, 2010

(54) SWIVELING ROLL BAR

(75) Inventors: Hans-Werner Kürten, Gödenroth (DE); Karl-Harmann Mötz, Nörtershausen (DE)

(73) Assignee: Bomag GmbH, Boppard (DE)

( * ) Notice: Subject to any disclaimer, the term of this patent is extended or adjusted under 35 U.S.C. 154(b) by 0 days.

(21) Appl. No.: 12/188,559

(22) Filed: Aug. 8, 2008

(65) Prior Publication Data

US 2008/0309058 A1 Dec. 18, 2008

Related U.S. Application Data

(63) Continuation of application No. 11/086,243, filed on Mar. 23, 2005, now abandoned.

(30) Foreign Application Priority Data

Mar. 24, 2004 (DE) ........................ 10 2004 014 475

(51) Int. Cl.
B60R 21/13 (2006.01)
(52) U.S. Cl. ..................... 280/756; 296/190.03; 403/93
(58) Field of Classification Search ................ 280/756; 296/190.03, 190.04, 190.05, 190.06; 403/93, 403/95, 96, 100, 101, 102
See application file for complete search history.

(56) References Cited

U.S. PATENT DOCUMENTS

| 1,652,102 | A |   | 12/1927 | Elmer et al. |
| 1,990,820 | A |   | 2/1935 | Flader |
| 2,067,255 | A |   | 1/1937 | Bittorff |
| 2,085,612 | A |   | 6/1937 | Spiess |
| 3,563,401 | A |   | 2/1971 | Gandolfo ................. 214/672 |
| 3,976,338 | A |   | 8/1976 | Trachte et al. |
| 4,158,460 | A | * | 6/1979 | White ..................... 280/756 |
| 4,403,799 | A |   | 9/1983 | Kafka et al. |
| 4,949,991 | A |   | 8/1990 | Ludwig ................... 280/756 |
| 5,440,948 | A |   | 8/1995 | Cheng |
| 5,503,430 | A |   | 4/1996 | Miki et al. ............... 280/756 |
| 5,779,272 | A |   | 7/1998 | Panek et al. |
| 5,839,758 | A |   | 11/1998 | Finch et al. |
| 6,082,753 | A |   | 7/2000 | Kotlier et al. |

(Continued)

FOREIGN PATENT DOCUMENTS

DE 2505577 8/1976

(Continued)

Primary Examiner—Paul N Dickson
Assistant Examiner—Drew Brown
(74) Attorney, Agent, or Firm—Baker & Hostetler LLP

(57) ABSTRACT

The invention relates to a swivelable roll bar, in particular for construction vehicles, with two vertical carriers, each of which has a pair of spars, whereby in each, one spar is connected swivelably through a link joint with the another spar, and the link joint comprises a lock and a stop. The stop consists of a joint stiffener, which is built as an extension of one spar and partially grips about the end of the other. In addition to that, the lock has a continuously adjustable final control element, with which the joint stiffener can be braced against the other spar. With the grip about the other spar, the flexural strength of the link joint of the swivelable roll bar is increased. Further, the bracing of the joint stiffener against the other spar eliminates the play in the link joint. The joint stiffener is preferably built as a U-shaped tubular segment that is attached to the latter as an extension of the spar.

9 Claims, 5 Drawing Sheets

U.S. PATENT DOCUMENTS

| | | |
|---|---|---|
| 7,029,197 B2 | 4/2006 | Lin et al. |
| 7,396,047 B1 * | 7/2008 | Young ........................ 280/756 |
| 7,438,319 B2 * | 10/2008 | Cooper et al. ............... 280/756 |
| 2003/0071549 A1 | 4/2003 | Tarantik |

FOREIGN PATENT DOCUMENTS

| | | |
|---|---|---|
| DE | 2543077 | 3/1977 |
| GB | 1493748 | 11/1977 |
| GB | 2175259 | 11/1986 |
| JP | 11078740 | 3/1999 |

* cited by examiner

SWIVELING ROLL BAR

CROSS REFERENCE TO RELATED APPLICATIONS

This application claims priority to and is a continuation of U.S. patent application Ser. No. 11/086,243, filed Mar. 23, 2005, entitled "Swiveling Roll Bar," which claims priority to German Patent Application No. 102004014475.5, filed Mar. 24, 2004, entitled "Foldable Rollover Protection System," the disclosures of which are hereby incorporated by reference in their entirety.

FIELD OF THE INVENTION

The invention relates to a swiveling roll bar for vehicles, especially for construction vehicles, with two vertical carriers, each one of which has one pair of spars, which are connected with each other through swivelable link joints. Further, the link joints have both a lock as well as a stop, which limit the swivel area of the roll bar.

BACKGROUND OF THE INVENTION

Work vehicles, especially construction vehicles, are often equipped with rollover protective fixtures and roll bars, which are fixed on the vehicle frame and extend upwards, to protect the operator in case of a overturning of the vehicle. If the work vehicle is equipped with a driver's cabin, the roll bar is normally integrated in the driver's cabin. However, if the work vehicle is furnished without a driver's cabin, the roll bar is normally built separately, whereby the roll bar is normally built as a U-shaped bar, whose free ends are fixed on the vehicle frame and whose cross members are essentially arranged above the head of the operator. Due to this, the roll bar is frequently that part of the vehicle that stretches farthest upwards.

Such an upward jutting roll bar can be disadvantageous, for example, during transport of the vehicle or during its operation.

To overcome this problem, roll bars equipped with folding mechanisms are known, which allow swinging away of the upper portion of the roll bar so as to reduce the height of the work vehicle. In general, these folding mechanisms have locks, with which the upper segment of the roll bar is arrested in a up-swung state against the lower stationary segment of the roll bar. Swiveling roll bars are known, in which the upper swiveling segment is connected with the lower, stationary segment by means of two bolts. Here one bolt works as a hinge, which is built stationary between both the segments. The other bolt can be removed and thus allows swiveling away of the upper segment. Here, the locking bolt is parallel to the swivel axis of the hinge.

The disadvantage thereby is that such a catch has some play due to the bolting and that the upper segment of the roll bar can swing out under operation related vibrations. Moreover, such a connection is difficult to manufacture.

To overcome this problem there are constructions, in which the upper segment of the roll bar is arrested through several screw connections, instead of through one bolt. The disadvantage thereby is that the removal of the screws to unswing the upper segment of the roll bar is possible only by using tools. Further, the screws are removed completely to swivel back the upper segment of the roll bar and can be lost easily. In addition to that, the screw connection must be made with the prespecified clamping torque and hence can be carried out only by trained personnel.

In the event of an overturn of the work vehicle, massive forces and moments arise, which work on the roll bars and must be absorbed by the vertical spars. Buckling, bending or breaks can occur in the area of the joint connection between the upper and the lower segments of the roll bar, since in general it is this part of the roll bar, which can least absorb the forces.

SUMMARY OF THE INVENTION

The underlying task posed by invention is therefore to prepare a swiveling roll bar, especially for construction vehicles, which exhibits an simple built, whose link joints have high stiffness, and thus can absorb massive forces, and whose upper, swiveling segment can lock against the lower, solid segment without play.

This task is solved in the invention in that the stop of the link joint consists of a link joint stiffener, which on its part consists of an extension of one spar of the spar pair and one end of the spar grasps the other spar of the spar pair partly. Further, the lock has a continuously adjustable final control element, with which the joint stiffener can be braced against the other spar.

Advantageous embodiments of the invention are stated in the subordinate claims.

Due to the fact that the extension of one spar partially grips an end of the other spar, an inflexible connection results between the two spars in locked state. This significantly improves the ability of the link joint to absorb forces, and with that, the likelihood of a buckling, bending or breaking is reduced.

As the joint stiffener grips the other spar, it is possible to tighten the joint stiffener against the other spar using a final control element. The tightening eliminates the play in the connection of the upper and the lower segment of the roll bar and thus prevents the swinging away of the upper segment of the roll bar in case of vibrations. It is of advantage if a continuously adjustable final control element is built with integration in the link joint, so that the final control element cannot be lost when the lock is released.

In a further advantageous development of the invention, the lock is so arranged that its line of action lies in the swivel plane of the spar. Thus the final control element essentially acts diagonally to the swivel axis and is not parallel to swivel axis as in the hitherto known embodiments, so that greater tension is generated when locking, which increases the stiffness of the link joint.

It is of advantage, if the joint stiffener is constructed as a U-shaped receiver, so that a strong gripping of the other spar is ensured. Preferably, the U-shaped receiver is designed as a tubular segment, which is open on one side in the longitudinal direction. Further, the joint stiffener can be produced from a separate work piece that is fixed on one spar. This has the advantage that both the standard spars as well as the standard tube segments can be used, which further simplifies the manufacture and assembly of the device.

In a further embodiment, the U-shaped receiver exhibits a stationary connection with a spar. Preferably, the connection is produced by welding. This stationary type of connection increases the receiving capacity of the link joint of the bending moments.

It is of advantage, if the link joint comprises a hinge, whereby a movable part of the hinge is built with a joint stiffener and the other part of the hinge is built as a hinge bearing, which is fixed on the other spar. With this arrangement, one spar is arranged with a recess between the hinge and thus also from the swivel axis of the link joint, due to which the upper segment of the roll bar can be swiveled away over the vertex. Due to the slightly forward inclined position of the upper segment of the roll bar resulting from this, the area over which the operator is protected in case of an overturn is increased.

In an especially preferred embodiment, the joint stiffener completely grips three sides of the other spar. This three-sided grip further increases the stiffness of the link joint. Preferably, the joint stiffener is so arranged that its open side corresponds to the side of the link joint nearest to the hinge.

In a further embodiment, the final control element is constructed as a clamping screw. Preferably, the lock comprises a clamping bolt, which is arranged between the joint stiffener and the screw head and exhibits an opening, through which the threading of the clamping screw is arranged. It is preferable further, if the joint stiffener exhibits a recess in the area of the clamping bolt. Thereby the recess is designed in such a fashion that the clamping bolt of the clamping screw presses against the boundary of the recess. If the clamping screw is loosened, the clamping bolt can be brought into a position, in which it overlaps the recess, so that the joint stiffener is released. On one hand, the tension resulting from the planar support of the clamping bolt can be distributed better on the joint stiffener and on the other hand the clamping screw and the clamping bolt remain firmly connected with the link joint when loosened, so that they cannot be lost.

It is of advantage, if the clamping screw is constructed as a tommy screw, so that no tool is required to tighten the joint stiffener against the other spar.

In a further advantageous embodiment, the lock is constructed as an eccentric clamp. This embodiment is relatively simple to handle and requires lesser effort for tightening the joint stiffener against the other spar. Further, the eccentric clamp is fastened on the other spar, so that this locking device is not lost in released state.

In an especially preferred embodiment, the lock has a two-armed swivel bolt, whereby the final control element of the lock is arranged on one arm. The final control element is preferably built as a clamping screw or a stop bolt. The swivel bolt is thereby so arranged that the arm without the final control element, in case the upper segment of the roll bar is swung high completely, can be swiveled over and away from the joint stiffener. In that state, the final control element is above the other spar. Therefore, due to the fastening of the swivel bolt on the other spar, it cannot be lost even in released state.

In a further preferable embodiment, the joint connection is constructed with elastic bearing support. Thereby, the elastic bearing element is preferably arranged between the hinge axis and the other spar. On swinging up the upper segment of the roll bar, the joint stiffener presses against the end of the other spar, due to which the elastic bearing element is pressed together and pre-stress is generated. This pre-stress leads to further improvement in the stiffness of the link joint.

BRIEF DESCRIPTION OF THE DRAWINGS

Preferred embodiments of the invention are explained below in more detail on the basis of the attached drawings. The drawings show.

DETAILED DESCRIPTION

In the various embodiments according to the invention shown in the following figures, the same components are indicated with the same reference signs.

Figure 1:
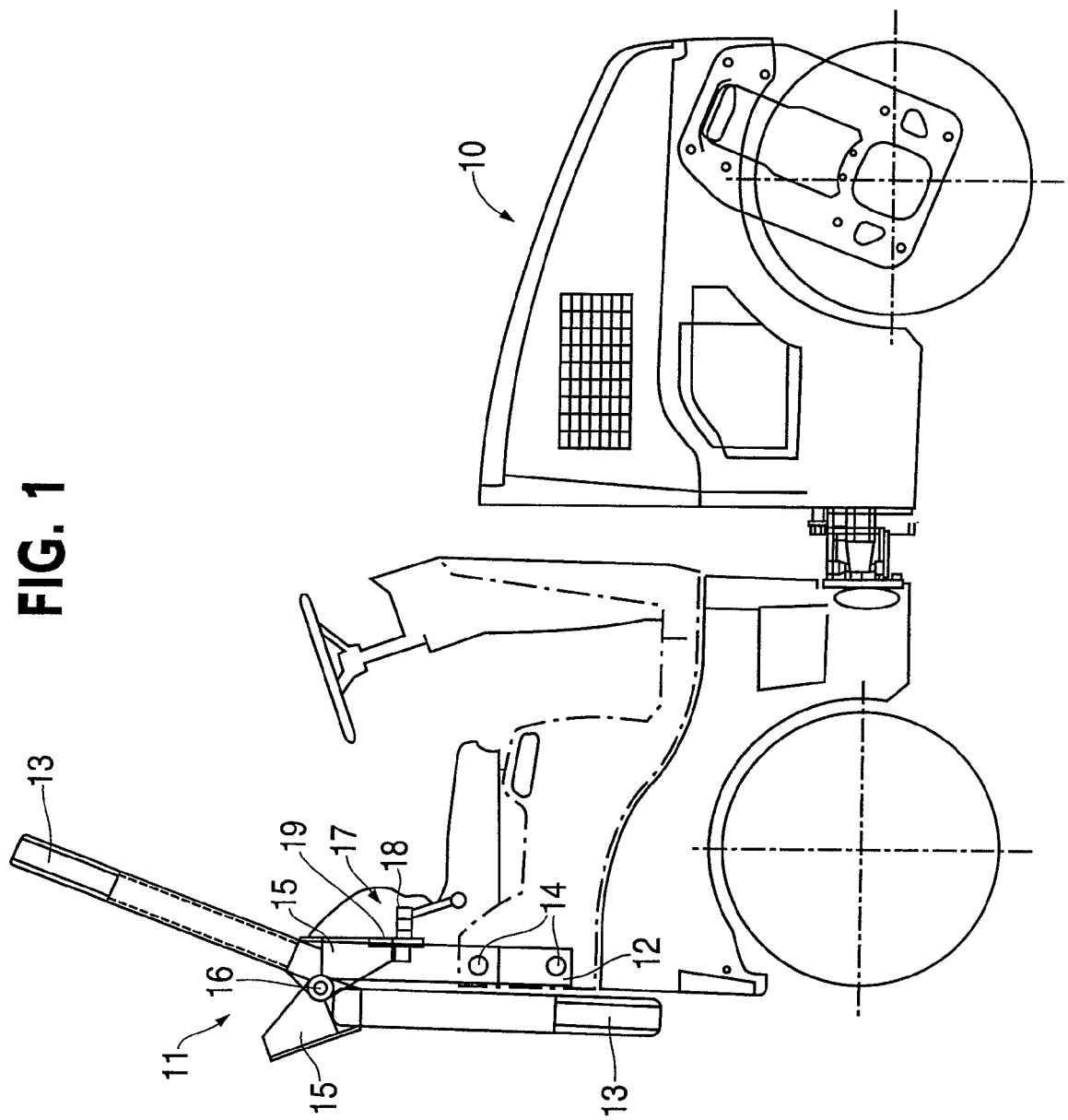
FIG. 1 A side view of a roller without driver's cabin, with a swiveling roll bar both in the arrested and in the swiveled down state.

FIG. 1 shows the side view of a cylinder 10 with a swiveling roll bar 11, which has a stationary spar 12 and a swiveling spar 13. The roll bar 11 is displayed not only in the locked but also in the down-swung state. The stationary spar 12 is fixed with the cylinder frame of the cylinder 10 by means of bolt connections 14.

As it can be seen in FIG. 1, a link joint 15 is attached at the end the swivelable spar 13. The joint stiffener 15 consists, in the shown example, of a U-shaped tubular segment, whereby the U-shaped tubular segment 15 is so arranged that its open side corresponds to that side of the roll bar 11, on which the hinge 16 is attached. The U-shaped tubular segment 15 is welded with the swivelable spar 13 and is connected with the hinge 16, so that the U-shaped tubular segment 15, together with the welded, upper, swivelable hinge 13, can swivel about the hinge 16. The hinge 16 is welded with the stationary spar 12.

In the up-swung state of the swivel able hinge 13, due to the lock 17, the U-shaped tubular segment 15 braces against the stationary hinge 12. The lock 17 is so arranged, that it acts in the swivel plane of the roll bar 11, due to which the bracing of the U-shaped tubular segment 15 with the stationary spar 12 is increased. In the example shown, the lock is built with a tommy screw 18 and a clamping bolt 19. The tommy screw 18 enables easy handling during the locking and releasing of the swivelable spar 13.

Figure 2:
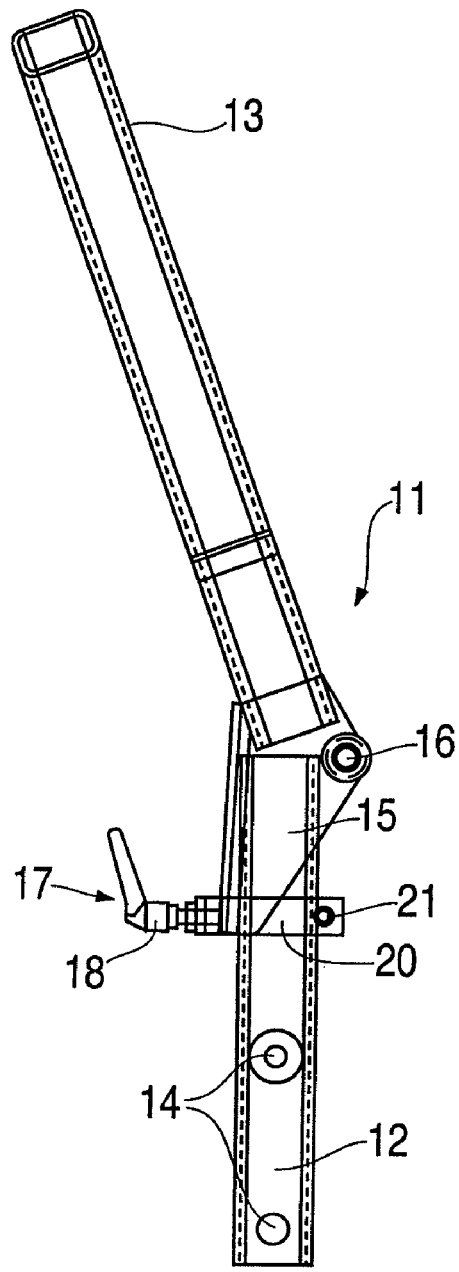
FIG. 2 A side view of a swiveling roll bar with swivel bar lock in the locked state.

FIG. 2 shows the side view of a swivelable roll bar 11 in locked state. The lock 17 consists of a tommy screw 18, which is fastened to a swivel bar 20. The swivel bar 20 is swivelable about a strap hinge 21, which on its part is firmly fastened to a stationary hinge 12. The swivel bar is thereby so arranged that it can swivel about the lower end of the U-shaped tubular segment 15. When the swivel bar 20 swivels about the lower end of the U-shaped tubular segment 15, it can be braced against the stationary spar 12 by tightening the tommy screw 18, with which the roll bar 11 is locked.

Figure 3:
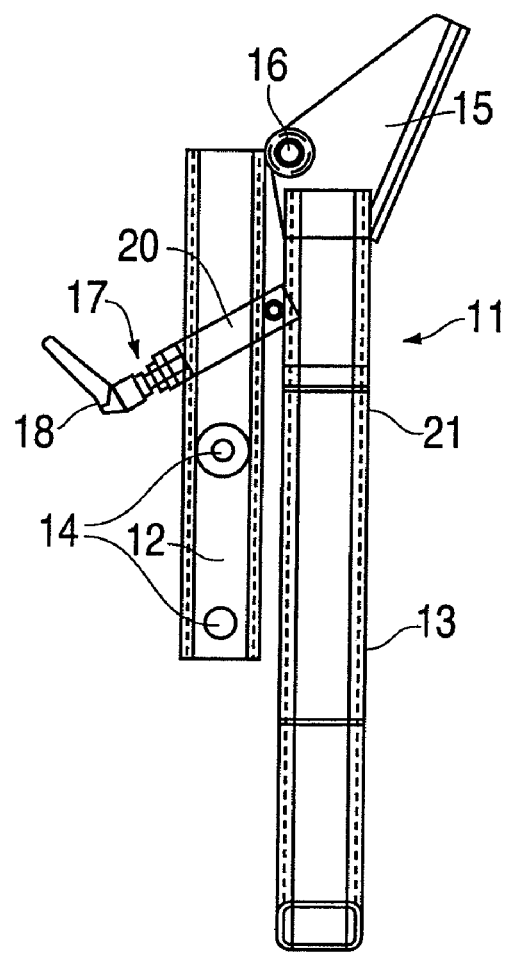
FIG. 3 A side view of the swiveling roll bar with swivel bar lock in FIG. 2 in down swung state.

In FIG. 3, a side view of the roll bar of FIG. 2 is shown, whereby the lock 17 is released and the swivelable hinge 13 is swung down.

Figure 4:
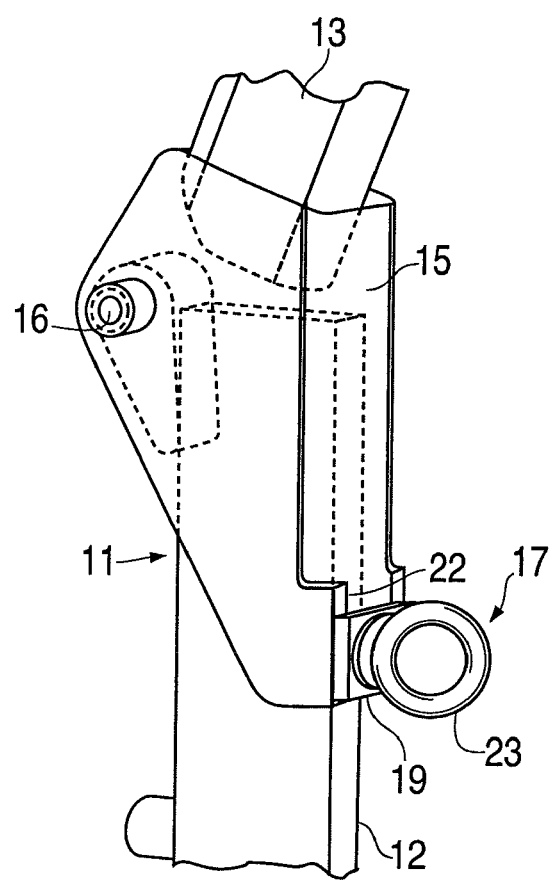
FIG. 4 A perspective view of a link joint of a swiveling roll bar with eye bolt/clamp bolt lock in locked state.

In FIG. 4, a perspective view of a section of a swivelable roll bar 11 in locked state is shown. The lock 17 consists of a clamping bolt 19 and an eye bolt 23. The U-shaped tubular segment 15 shows a recess 22, which is at the lower end of the U-shaped tubular segment in the region of the lock 17. Both the clamping bolt 19 as well as the recess 22 have rectangular shape. Their dimensions match each other in such a fashion that in crosswise position, the clamping bolt has contact with the U-shaped tubular segment 15 and the latter braces against the stationary hinge 12 on tightening the eye bolt 23. If the eye bolt 23 is released, the clamping bolt 19 can be swung by about 90°, so that it can then match the recess 22, and the U-shaped tubular segment 15, together with the swivelable hinge 13, can be released.

Figure 5:
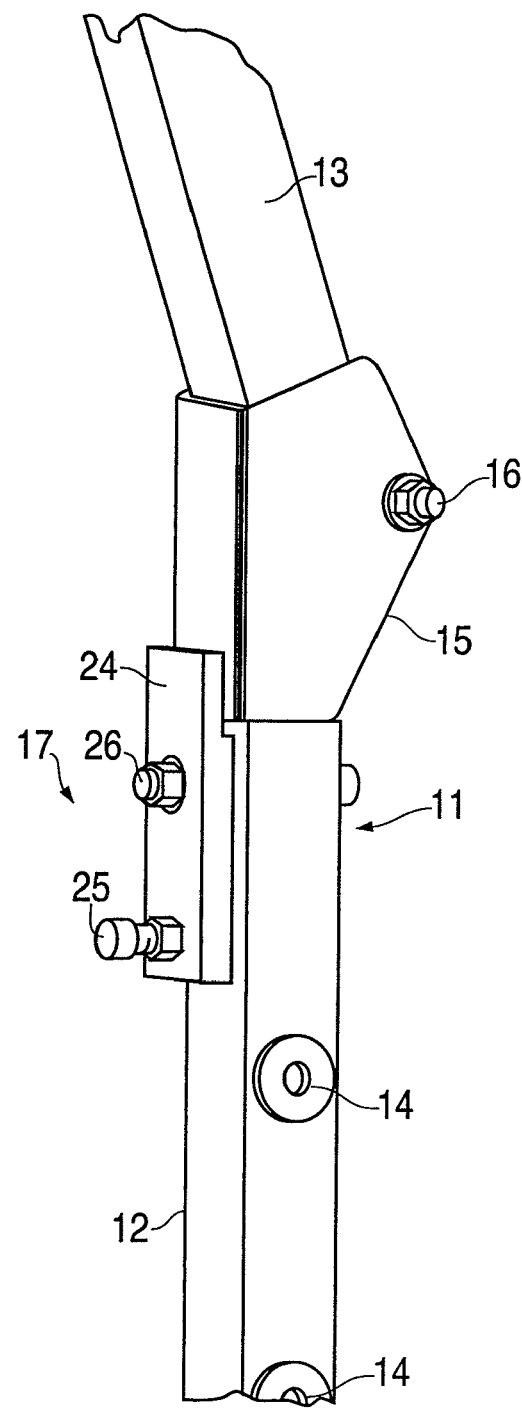
FIG. 5 A perspective view of a link joint of a roll bar with swivel bolt lock in locked state.

In FIG. 5 a perspective view of a part of a swivelable roll bar 11 in locked state is shown. The lock 17 consists of a two-arm swivel bar 24, which has, on one arm, clamping screw/stop bolts built as a clamping screw grip 25. The swivel bar 24 is connected with the stationary hinge 12 through the bolt 26, built almost at the center. Thereby the bolt connection 26 is so constructed that the swivel bar 24 can be rotated about the bolt. In locked state, the free arm of the swivel bar 24 is turned about the lower end of the U-shaped tubular segment 15, so that the other arm, on which the clamping screw grip 25 is attached, is above the stationary hinge 12. By tightening the clamping screw grip 25, the free arm of the swivel bar 24, is pressed against the U-shaped tubular segment 15, due to which it braces against the stationary hinge 12.

Figure 6:
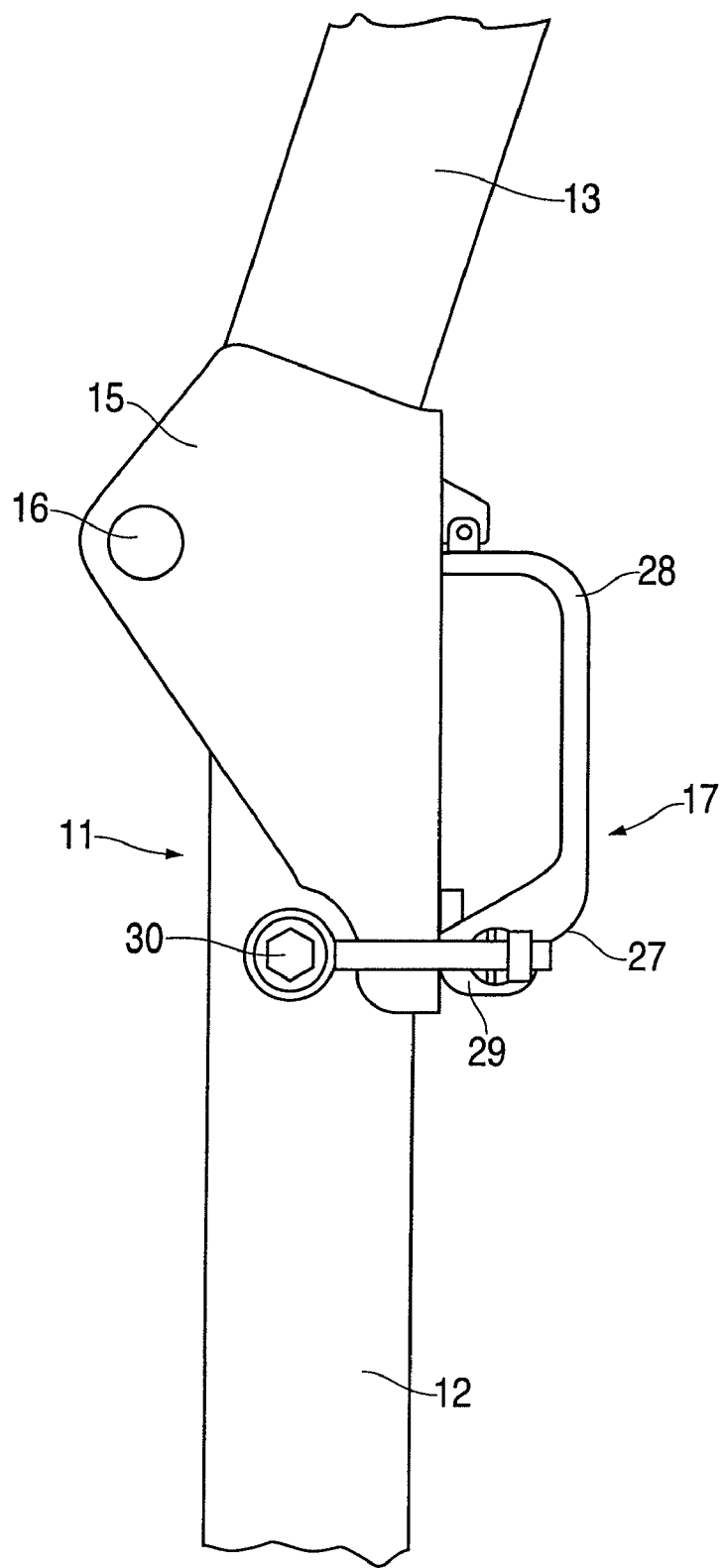
FIG. 6 A side view of a link joint of a swiveling roll bar, with an eccentric clamp as the lock, in locked state.

In FIG. 6, the side view of a part section of a swivelable roll bar 11 in locked state is shown. The lock 17 consists of an eccentric clamp 27, which is attached to the hinge 12. The eccentric clamp 27 has a handle 28, which is connected with an eccentric clamping element 29. Further, the eccentric clamp 27 can swivel about the swivel hinge 30, above which it is fastened at the lower spar 12. In the locked state, the eccentric clamp 27 is swiveled about the lower part of the U-shaped tubular segment 15 and the grip 28 is folded up, till it touches the U-shaped tubular segment 15. By folding the handle 28 up, the eccentric clamping element 29 is pressed against the lower part of the U-shaped tubular segment 15, so that it is braced against the lower hinge 12. To release the lock, the handle 28 is folded down, due to which the eccentric clamping element 29 is released, the eccentric clamp 27 swings down and the U-shaped tubular segment 15, together with the swivelable spar 13, is released.

Figure 7:
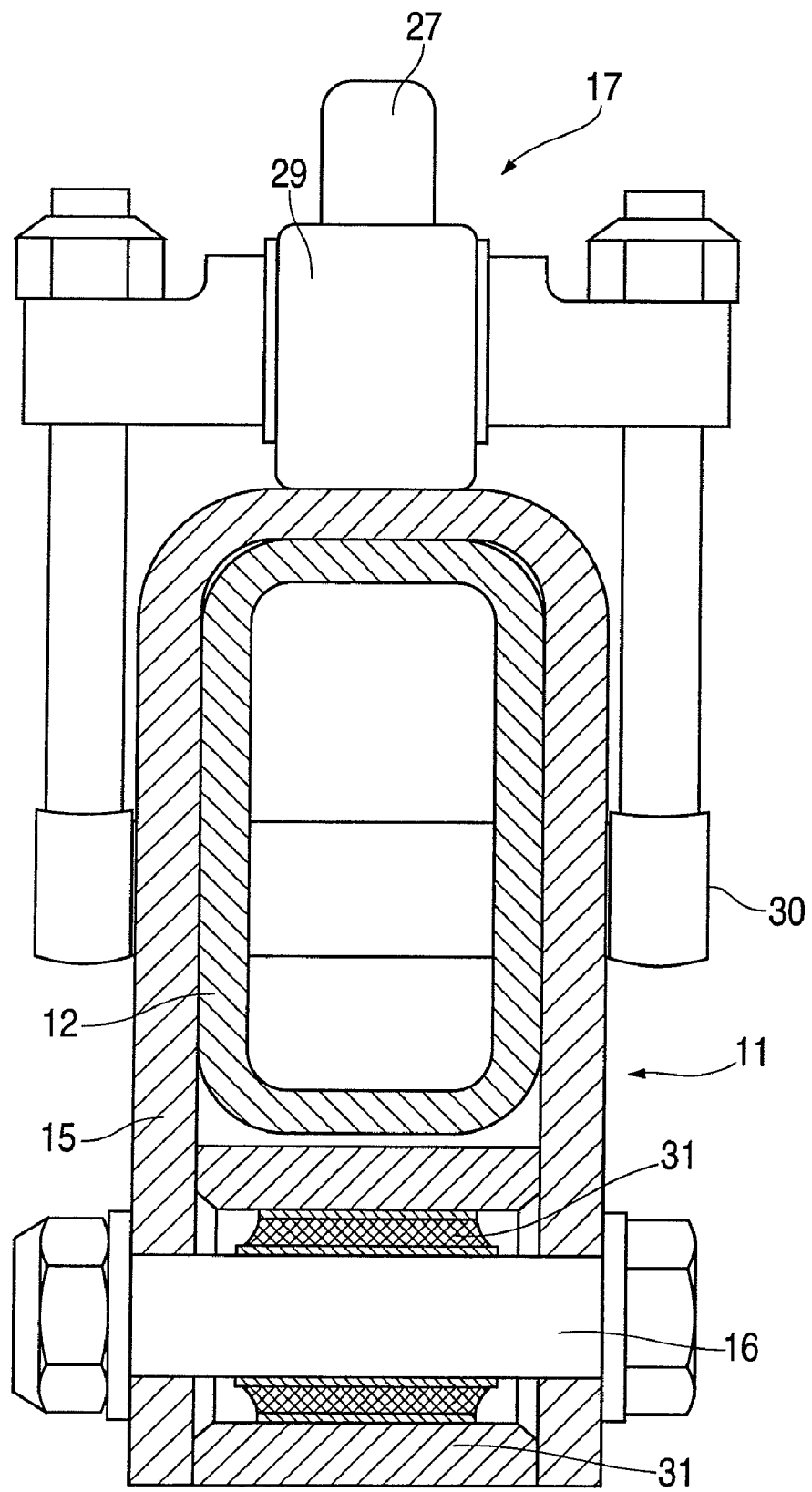
FIG. 7 A cross section through a link joint of a swiveling roll bar with elastic bearing and an eccentric clamp as lock.

In FIG. 7 a cross section in the region of the link joint of a swivelable roll bar 11 in locked state is shown. The lock 17 is constructed as an eccentric clamp 27. The embodiment according to the invention shown in FIG. 7 has a buffer 31 made from an elastic material, which is arranged between the hinge 16 and the stationary spar 12. In the example shown in FIG. 7, the buffer 31 made from an elastic material is embodied as an elastic cuff, which is put through the hinge 16. On folding the swivelable hinge 13 up (not shown here), the U-shaped tubular segment 15 is pressed against the stationary spar 12. Just before the area of the U-shaped tubular segment 15 and the stationary spar 12 come to rest, a wedge-like action takes place, due to which the buffer 31 is pressed together and the hinge 16 is pre-stressed.

The invention claimed is:

1. A swivelable roll bar with two vertical carriers, comprising:
   a first and a second spar, the first spar connected to the second spar swivelably through a link joint, the link joint comprising
   a stop comprising a joint stiffener, rigidly attached to the second spar and pivotally attached to the first spar and adapted to partly surround the first spar, the joint stiffener having a recess; and
   a lock having an adjustable final control element, which is connected with the first spar via an actuating element, the adjustable final control element can lock the joint stiffener by swiveling over the recess of the joint stiffener and connect the joint stiffener by means of the actuating element with the first spar, the joint stiffener can be unlocked by rotating the adjustable final control element to a position where it coincides with the recess.

2. The swivelable roll bar of claim 1, wherein the joint stiffener is braced with the actuating element substantially transversally to the swiveling axis with the first spar.

3. The swivelable roll bar of claim 1, wherein the adjustable final control element is a clamping bolt.

4. The swivelable roll bar of claim 1, wherein the actuating element is an eye-bolt.

5. The swivelable roll bar of claim 1, wherein the joint stiffener consists of a U-shaped receptacle.

6. The swivelable roll bar of claim 5, wherein the U-Shaped receptacle is attached to the second spar in a stationary manner.

7. The swivelable roll bar of claim 1, wherein the joint stiffener grips three sides of the first spar.

8. The swivelable roll bar of claim 1, wherein the link joint is held elastically, with an elastic bearing being arranged in such a way that on bracing the joint stiffener is pressed against the first spar.

9. The swivelable roll bar of claim 1, wherein the link joint comprises a hinge having a movable part and a hinge bearing, wherein the movable part of the hinge is the joint stiffener on the second spar and the hinge bearing is fastened on the first spar.

* * * * *